(12) United States Patent
Alameh et al.

(10) Patent No.: US 8,319,170 B2
(45) Date of Patent: Nov. 27, 2012

(54) METHOD FOR ADAPTING A PULSE POWER MODE OF A PROXIMITY SENSOR

(75) Inventors: Rachid M Alameh, Crystal Lake, IL (US); Aaron L Dietrich, Caledonia, IL (US)

(73) Assignee: Motorola Mobility LLC, Libertyville, IL (US)

( * ) Notice: Subject to any disclaimer, the term of this patent is extended or adjusted under 35 U.S.C. 154(b) by 338 days.

(21) Appl. No.: 12/500,625

(22) Filed: Jul. 10, 2009

(65) Prior Publication Data

US 2011/0006190 A1    Jan. 13, 2011

(51) Int. Cl.
    *G06M 7/00*    (2006.01)
(52) U.S. Cl. ...................................................... 250/221
(58) Field of Classification Search ................ 250/221; 345/175
    See application file for complete search history.

(56) References Cited

U.S. PATENT DOCUMENTS

| | | |
|---|---|---|
| 4,286,289 A | 8/1981 | Ottesen et al. |
| 4,806,709 A | 2/1989 | Evans |
| 4,914,624 A | 4/1990 | Dunthorn |
| 4,967,083 A | 10/1990 | Kornbrekke et al. |
| 5,179,369 A | 1/1993 | Person et al. |
| 5,414,413 A | 5/1995 | Tamaru et al. |
| 5,684,294 A | 11/1997 | Kouhi |
| 5,781,662 A | 7/1998 | Mori et al. |
| 5,821,521 A | 10/1998 | Bridgelall et al. |
| 5,945,988 A | 8/1999 | Williams et al. |
| 6,002,427 A | 12/1999 | Kipust |
| 6,107,994 A | 8/2000 | Harada et al. |
| 6,184,538 B1 | 2/2001 | Bandara et al. |
| 6,215,116 B1 * | 4/2001 | Van Marcke ................ 250/221 |
| 6,246,407 B1 | 6/2001 | Wilks et al. |
| 6,246,862 B1 | 6/2001 | Grivas et al. |
| 6,292,674 B1 | 9/2001 | Davis |
| 6,330,457 B1 | 12/2001 | Yoon |
| 6,438,752 B1 | 8/2002 | McClard |
| 6,460,183 B1 | 10/2002 | Van Der Vleuten |
| 6,525,854 B1 | 2/2003 | Takahashi et al. |
| 6,721,954 B1 | 4/2004 | Nickum |
| 6,804,012 B2 | 10/2004 | Gombert |

(Continued)

FOREIGN PATENT DOCUMENTS

EP    1445922 A1    8/2004

(Continued)

OTHER PUBLICATIONS

"Microsoft's SideSight: Something Apple Should Watch", www.gearlog.com (Oct. 20, 2008).

(Continued)

*Primary Examiner* — Thanh X Luu

(57) ABSTRACT

There is described portable electronic devices having one or more proximity sensors with adaptive capabilities that can help reduce power consumption. The proximity sensors of the portable electronic device in accordance with the present invention may be adjusted to operate in multiple and/or different modes. These modes are environmentally and contextually driven. An adaptive sensor is dynamically adjusted based on different criteria. In particular, adjustments are based on correlations of input signals from one or more sensors of the device, data signals received from the device's processor and/or external data signals received from an external source, which provide characterization values of environmental, contextual and/or ambient light characteristics. Adjustments are made to pulse power to affect the range of the sensor, pulse frequency, filtering of noise of the sensor input signal to attenuate interference and the spectrum of a proximity detector.

5 Claims, 3 Drawing Sheets

U.S. PATENT DOCUMENTS

| | | | |
|---|---|---|---|
| 6,816,154 | B2 | 11/2004 | Wong et al. |
| 6,933,922 | B2 | 8/2005 | Casebolt et al. |
| 6,941,161 | B1 | 9/2005 | Bobisuthi et al. |
| 7,046,230 | B2 | 5/2006 | Zadesky et al. |
| 7,134,092 | B2 | 11/2006 | Fung et al. |
| 7,166,966 | B2 | 1/2007 | Naugler, Jr. et al. |
| 7,212,835 | B2 | 5/2007 | Mantyjarvi et al. |
| 7,340,077 | B2 | 3/2008 | Gokturk et al. |
| 7,368,703 | B2 | 5/2008 | De Samber et al. |
| 7,380,716 | B2 | 6/2008 | Yokoyama |
| 7,468,689 | B2 | 12/2008 | Ma et al. |
| 7,486,386 | B1 * | 2/2009 | Holcombe et al. ............ 356/4.01 |
| 7,489,297 | B2 | 2/2009 | Hohmann et al. |
| 7,519,918 | B2 | 4/2009 | Trantow |
| 7,532,196 | B2 | 5/2009 | Hinckley |
| 7,534,988 | B2 | 5/2009 | Kong et al. |
| 7,557,965 | B2 | 7/2009 | Taylor et al. |
| 7,561,146 | B1 | 7/2009 | Hotelling |
| 7,630,716 | B2 | 12/2009 | Tamura et al. |
| 7,687,774 | B2 | 3/2010 | Ohta et al. |
| 7,721,310 | B2 | 5/2010 | Schaffer et al. |
| 7,728,958 | B2 | 6/2010 | Pfaff |
| 7,795,584 | B2 | 9/2010 | Mok et al. |
| 7,855,716 | B2 | 12/2010 | McCreary et al. |
| 7,912,376 | B2 | 3/2011 | Rollins |
| 7,971,156 | B2 | 6/2011 | Albertson et al. |
| 7,991,896 | B2 | 8/2011 | Shen et al. |
| 8,006,002 | B2 | 8/2011 | Kalayjian et al. |
| 8,018,501 | B2 | 9/2011 | Sasaki |
| 8,023,061 | B2 | 9/2011 | Ra |
| 8,072,469 | B2 | 12/2011 | Ottney |
| 8,104,113 | B2 | 1/2012 | Rodenbeck et al. |
| 2001/0019338 | A1 | 9/2001 | Roth |
| 2002/0104081 | A1 | 8/2002 | Candelore et al. |
| 2002/0122072 | A1 | 9/2002 | Selker |
| 2002/0199186 | A1 | 12/2002 | Ali et al. |
| 2003/0063128 | A1 | 4/2003 | Salmimaa et al. |
| 2003/0222917 | A1 | 12/2003 | Trantow |
| 2005/0104860 | A1 | 5/2005 | McCreary et al. |
| 2005/0150697 | A1 | 7/2005 | Altman et al. |
| 2005/0232447 | A1 | 10/2005 | Shinozuka et al. |
| 2005/0289182 | A1 | 12/2005 | Pandian et al. |
| 2006/0010400 | A1 | 1/2006 | Dehlin et al. |
| 2006/0028453 | A1 | 2/2006 | Kawabe |
| 2006/0031786 | A1 | 2/2006 | Hillis et al. |
| 2006/0059152 | A1 | 3/2006 | Nakamura |
| 2006/0125799 | A1 | 6/2006 | Hillis et al. |
| 2006/0132456 | A1 | 6/2006 | Anson |
| 2006/0161870 | A1 | 7/2006 | Hotelling et al. |
| 2006/0161871 | A1 | 7/2006 | Hotelling et al. |
| 2006/0256074 | A1 | 11/2006 | Krum et al. |
| 2007/0109266 | A1 | 5/2007 | Davis et al. |
| 2007/0137462 | A1 | 6/2007 | Barros et al. |
| 2007/0177803 | A1 | 8/2007 | Elias et al. |
| 2007/0180392 | A1 | 8/2007 | Russo |
| 2007/0220437 | A1 | 9/2007 | Boillot |
| 2007/0247643 | A1 | 10/2007 | Nakamura et al. |
| 2008/0005703 | A1 | 1/2008 | Radivojevic et al. |
| 2008/0006762 | A1 | 1/2008 | Fadell et al. |
| 2008/0024454 | A1 | 1/2008 | Everest |
| 2008/0052643 | A1 | 2/2008 | Ike et al. |
| 2008/0079902 | A1 | 4/2008 | Mandelstam-Manor et al. |
| 2008/0122803 | A1 | 5/2008 | Izadi et al. |
| 2008/0129688 | A1 | 6/2008 | Richardson et al. |
| 2008/0161870 | A1 | 7/2008 | Gunderson |
| 2008/0165140 | A1 | 7/2008 | Christie et al. |
| 2008/0192005 | A1 | 8/2008 | Elgoyhen et al. |
| 2008/0195735 | A1 | 8/2008 | Hodges et al. |
| 2008/0204427 | A1 | 8/2008 | Heesemans et al. |
| 2008/0211771 | A1 | 9/2008 | Richardson |
| 2008/0219672 | A1 | 9/2008 | Tam et al. |
| 2008/0225041 | A1 | 9/2008 | El Dokor et al. |
| 2008/0240568 | A1 | 10/2008 | Tonouchi |
| 2008/0252595 | A1 | 10/2008 | Boillot |
| 2008/0256494 | A1 | 10/2008 | Greenfield |
| 2008/0266083 | A1 | 10/2008 | Midholt et al. |
| 2008/0280642 | A1 | 11/2008 | Coxhill et al. |
| 2008/0284738 | A1 | 11/2008 | Hovden et al. |
| 2008/0297487 | A1 | 12/2008 | Hotelling et al. |
| 2008/0303681 | A1 | 12/2008 | Herz et al. |
| 2008/0309641 | A1 | 12/2008 | Harel et al. |
| 2009/0021488 | A1 | 1/2009 | Kali et al. |
| 2009/0031258 | A1 | 1/2009 | Arrasvuori et al. |
| 2009/0061823 | A1 | 3/2009 | Chu |
| 2009/0092284 | A1 | 4/2009 | Breed et al. |
| 2009/0158203 | A1 | 6/2009 | Kerr et al. |
| 2009/0277697 | A1 | 11/2009 | Bolt et al. |
| 2009/0299633 | A1 | 12/2009 | Hawes et al. |
| 2009/0303176 | A1 | 12/2009 | Chen et al. |
| 2011/0009194 | A1 | 1/2011 | Gabai et al. |
| 2012/0046906 | A1 | 2/2012 | Alameh et al. |

FOREIGN PATENT DOCUMENTS

| | | | |
|---|---|---|---|
| EP | 1657819 | A2 | 5/2006 |
| EP | 1760573 | A2 | 3/2007 |
| EP | 2000896 | A2 | 12/2008 |
| EP | 2037349 | A2 | 3/2009 |
| JP | 02280427 | A | 11/1990 |
| JP | 2005293419 | A | 10/2005 |
| JP | 2006010489 | A | 1/2006 |
| JP | 2007042020 | A | 2/2007 |
| JP | 2009085799 | A | 4/2009 |
| KR | 20030044749 | A | 6/2003 |
| KR | 1020050100642 | A | 10/2005 |
| WO | 9528777 | A1 | 10/1995 |
| WO | 0241129 | A2 | 5/2002 |
| WO | 03023701 | A2 | 3/2003 |
| WO | 03076870 | A1 | 9/2003 |
| WO | 2005076542 | A1 | 8/2005 |
| WO | 2005101176 | A2 | 10/2005 |
| WO | 2008016394 | A2 | 2/2008 |
| WO | 2008073289 | A2 | 6/2008 |

OTHER PUBLICATIONS

U.S. Appl. No. 12/344,760, filed Dec. 29, 2008, in the name of Rachid M. Alameh et al., entitled "Portable Electronic Device Having Self-Calibrating Proximity Sensors".

U.S. Appl. No. 12/347,146, filed Dec. 31, 2008, in the name of Rachid M. Alameh, entitled "Portable Electronic Device Having Directional Proximity Sensors Based on Device Orientation".

Metzger, C. et al., "FreeDigiter: A Contact-Free Device for Gesture Control" Eight International Symposium on Wearable Computers, ISWC 2004, Oct. 31-Nov. 3, 2004, 4 pages.

Specification of the Bluetooth System; Master Table of Contents & Compliance Requirements; Covered Core Package V. 3.0+HS; Apr. 21, 2009; 192 pages.

Silicon Laboratories, Inc., Si1120 Evaluation Kit User's Guide; Austin TX, Dec. 2009, 10 pages. www.silabs.com/support/pages/contacttechincalsupport.aspx.

Ward, A. et al., "A New Location Technique for the Active Office" IEEE Personal Communications, vol. 4, Issue 5; Oct. 1997, 11 pages.

Kahn, J.M. et al., "Imaging Diversity Receivers for High-Speed Infrared Wireless Communication", IEEE Communications Magazine, vol. 36, Issue 12, Dec. 1998, pp. 88-94.

Yun, G. and Kavehrad, M., "Spot-Diffusing and Fly-Eye Receivers for Indoor Infrared Wireless Communications" 1992 IEEE International Conference on Selected Topics in Wireless Communications, Jun. 25-26, 1992, pp. 262-265.

Dan Bricklin, "Gestures, the iPhone, and Standards: A Developer's Questions" Internet Discussion @ www.bricklin.com/gestures.htm; Oct. 24, 2007, 10 pages.

"Hadamard Transform" Wikipedia definition; http://en.wikipedia.org/wiki/Hadamard_transform; Downloaded Jan. 12, 2010, 4 pages.

Von Hardenberg, C. and Berard, F., "Bare-Hand Human-Computer Interaction" Proceedings of the ACM Workshop on Perceptive User Interfaces, Orlando, FL, USA, Nov. 15-16, 2001, 8 pages.

"How Trackir Works:" Internet Document @ www.naturalpoint.com/trackir/02-products/product-how-TrackIR-works.html; downloaded Jan. 13, 2010, 2 pages.

U.S. Appl. No. 12/641,830, filed Dec. 18, 2009 "Mobile device with user interaction capability and method of operating same".

U.S. Appl. No. 12/428,187, filed Apr. 22, 2009 "Menu Configuration System and Method for Display on an Electronic Device".

U.S. Appl. No. 12/428,266, filed Apr. 22, 2009 "Touch-Screen and Method for an Electronic Device".

Patent Cooperation Treaty, "PCT Search Report and Written Opinion of the International Searching Authority" for International Application No. PCT/US2009/06655 Jul. 16, 2010, 11 pages.

U.S. Appl. No. 12/646,199, filed Dec. 23, 2009 "Method and system for controlling data transmission to or from a mobile device".

U.S. Appl. No. 12/471,062, filed May 22, 2009 "Sensing Assembly for Mobile Device".

U.S. Appl. No. 12/646,601, filed Dec. 23, 2009, "Electronic device with sensing assembly and method for detecting gestures of geometric shapes".

U.S. Appl. No. 12/643,211, filed Dec. 21, 2009 "Electronic device with sensing assembly and method for interpreting consecutive gestures".

U.S. Appl. No. 12/640,867, filed Dec. 17, 2009 "Electronic device with sensing assembly and method for detecting basic gestures".

U.S. Appl. No. 12/645,244, filed Dec. 22, 2009 "Method and system for conducting communication between mobile devices".

U.S. Appl. No. 12/648,503, filed Dec. 29, 2009 "Electronic device with sensing assembly and method for interpreting offset gestures".

United States Patent and Trademark Office, U.S. Appl. No. 12/347,146 Non-Final Office Action dated Jul. 18, 2011, 9 pages.

United States Patent and Trademark Office, U.S. Appl. No. 12/428,260 Non-Final Office Action dated Oct. 5, 2011, 10 pages.

PCT, "Notification of Transmittal of the International Search Report and the Written Opinion of the International Searching Authority, or the Declaration", Sep. 30, 2010, pp. 1-13, PCT/US/2010/039561, European Patent Office.

Patent Cooperation Treaty, "PCT Search Report and Written Opinion of the International Searching Authority" for International Application No. PCT/US2010/061254 Apr. 7, 2011, 16 pages.

Patent Cooperation Treaty, "PCT Search Report and Written Opinion of the International Searching Authority" for International Application No. PCT/US2010/061261 Mar. 17, 2011, 14 pages.

USPTO U.S. Appl. No. 12/344,760 Notice of Allowance dated Jan. 3, 2011, 9 pages.

Patent Cooperation Treaty, "PCT Search Report and Written Opinion of the International Searching Authority" for International Application No. PCT/US2010/030964 Nov. 9, 2010, 24 pages.

Patent Cooperation Treaty, "PCT Search Report and Written Opinion of the International Searching Authority" for International Application No. PCT/US2010/033472 Dec. 15, 2010, 9 pages.

Patent Cooperation Treaty, "PCT Search Report and Written Opinion of the International Searching Authority" for International Application No. PCT/US2010/028654 Dec. 1, 2010, 22 pages.

United States Patent and Trademark Office "Non-Final Rejection" for U.S. Appl. No. 12/471,062 Apr. 25, 2011, 16 pages.

Pavlov et al., "Model-based object characterization with active infrared sensor array," 2007, IEEE Sensors 2007 Conference, pp. 360-363.

H. Christensen, "Retrieval of 3D-position of a passive object using infrared LED's and photodiodes," 2005, IEEE, pp. IV-1093-IV1096.

United States Patent and Trademark Office "Final Rejection" for U.S. Appl. No. 12/428,187 Apr. 10, 2012; 10 pages.

United States Patent and Trademark Office "Final Rejection" for U.S. Appl. No. 12/428,266 Mar. 14, 2012, 9 pages.

United States Patent and Trademark Office "Non-Final Rejection" for U.S. Appl. No. 12/646,199 Mar. 9, 2012, 17 pages.

United States Patent and Trademark Office "Non-Final Rejection" for U.S. Appl. No. 12/471,062 Oct. 4, 2011, 15 pages.

United States Patent and Trademark Office "Final Rejection" for U.S. Appl. No. 12/471,062 Feb. 22, 2012, 15 pages.

United States Patent and Trademark Office "Non-Final Rejection" for U.S. Appl. No. 12/646,601 Feb. 14, 2012, 9 pages.

United States Patent and Trademark Office "Non-Final Rejection" for U.S. Appl. No. 12/471,062 Sep. 30, 2011, 11 pages.

United States Patent and Trademark Office "Final Rejection" for U.S. Appl. No. 12/471,062 Mar. 30, 2012. 11 pages.

United States Patent and Trademark Office "Non-Final Rejection" for U.S. Appl. No. 12/648,503 Feb. 2, 2012, 7 pages.

United States Patent and Trademark Office "Non-Final Rejection" for U.S. Appl. No. 13/283,984 Dec. 21, 2012, 9 pages.

H. Ruser, "Object recognition with a smart low-cost active infrared sensor array", Nov. 21-23, 2005, 1st International Conference on Sensing Technology, pp. 494-499.

Kim, et al., "The gesture watch: a wireless contact-free gesture based wrist interface", 2007, 11th IEEE International Symposium on Wearable Computers, pp. 15-22.

Starner et al., "The gesture pendant: A self-illuminating, wearable, infrared computer vision system for home automation control and medical monitoring", 2000, IEEE 4th International Symposium on Wearable Computers, pp. 87-94.

United States Patent and Trademark Office "Non-Final Rejection" for U.S. Appl. No. 12/428,187 Oct. 26, 2011, 8 pages.

* cited by examiner

METHOD FOR ADAPTING A PULSE POWER MODE OF A PROXIMITY SENSOR

FIELD

The present invention relates generally to the field of electronic devices having one or more proximity sensors. More particularly, the present invention relates to a portable electronic device having one or more adjustable proximity sensor.

BACKGROUND

Proximity sensors are capable of detecting the presence of nearby objects without any physical contact. In particular, a proximity sensor emits an electromagnetic or electrostatic field, and observes changes in the field. In doing so, the proximity sensor detects any position changes of nearby objects based on changes to the electromagnetic or electrostatic field caused by the objects' presence. For example, a proximity sensor can generate and emit pulses of light of the infrared spectrum and receive infrared light that has bounced off objects to determine the proximity of the objects in its surroundings.

Wireless communication devices may utilize proximity sensors to manage the user experience and power consumption of its audio and video output components when adjacent to a user's ear. In particular, these devices may reduce speaker volume when the device's earpiece is positioned near the user's ear to avoid discomfort to the user's eardrums. As another example, the proximity sensor may turn off the device display when the device is positioned near the user's ear to save power. Thus, these types of wireless communication devices dynamically adjust the operation of audio and video output components when these components are positioned very close to, i.e., adjacent to, a user's ear.

DETAILED DESCRIPTION

Figure 1:
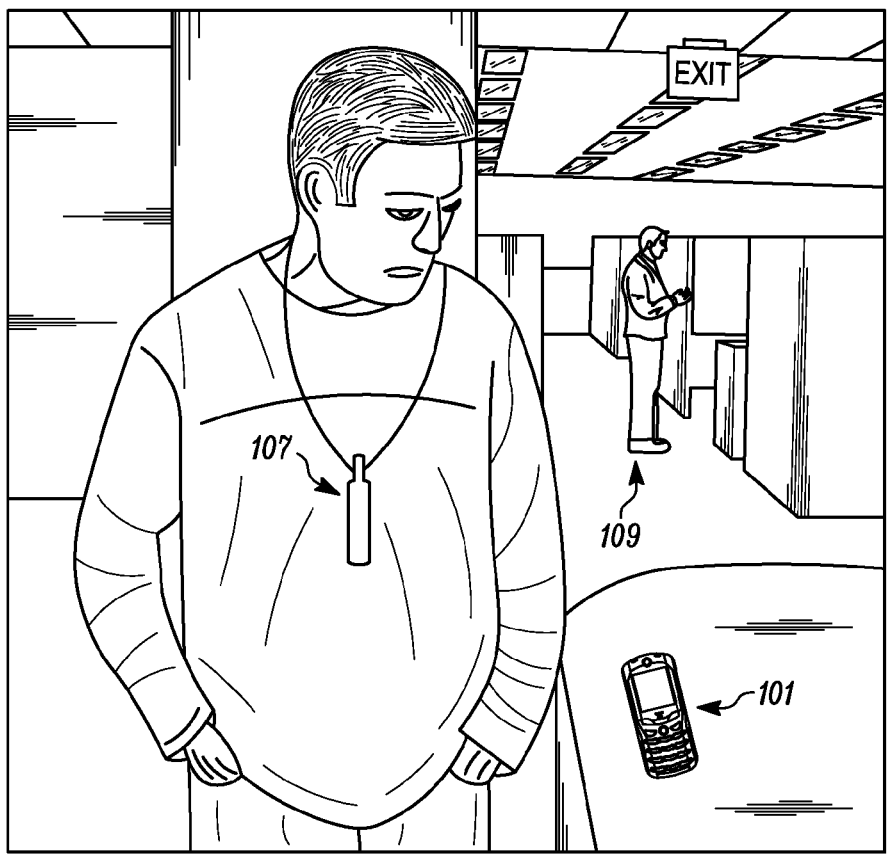
FIG. 1 is a general representation of an example environmental condition where the present invention may be utilized.

There is described portable electronic devices having one or more proximity sensors with adaptive capabilities that can help reduce power consumption. The proximity sensors of the portable electronic device in accordance with the present invention may be adjusted to operate in multiple and/or different modes. These modes are environmentally and contextually driven. An adaptive sensor is dynamically adjusted based on different criteria. In particular, adjustments are based on correlations of input signals from one or more sensors of the device, data signals received from the device's processor and/or external data signals received from an external source, which provide characterization values of environmental, contextual and/or ambient light characteristics. Adjustments are made to pulse power to affect the range of the sensor, pulse frequency, filtering of noise of the sensor input signal to attenuate interference and the spectrum of a proximity detector. Since the proximity sensors can be ultra-sensitive, making such adjustments can result in their optimized functionality and minimize their power consumption.

An adaptive sensor is dynamically adjusted by monitoring a one or more environmental and contextual characteristics. As mentioned, in one embodiment, adjustments can be made to pulse power to affect the range of the sensor. For example, if the environmental and/or context information indicates that the portable electronic device is positioned near the user's head, the range of the proximity sensor may be minimized. If the device is operating in a two-handed user mode, a determination is made of which hand of the user is supporting the back of the device, and an estimation is made of the device location relative to the user so that select sensors can be disabled so that their range is zero and the range of select sensors can be increased. If the environmental and/or context information indicates that the portable electronic device is placed on a horizontal surface, such as a table, the proximity sensors may be adjusted to operate at maximum range and monitor to detect any disturbances which may indicate user presence.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Referring to FIG. 1, there is shown a general representation of an example environmental condition where the present invention may be utilized. A portable electronic device 101 in accordance with the present invention may be carried by a user or, as shown in FIG. 1, placed remote from the user. For example, the portable electronic device 101 may be placed on another object, such as a horizontal surface 103. The portable electronic device 101 may use different criteria to detect characteristics in an environment 105.

Adjustments to an adaptive proximity sensor of the device 101 are based characteristic values derived from correlations of the different criteria. In particular, adjustments are based on correlated input signals from sensors of the device, data signals from the processor (that could indicate the mode the phone is in such as dialing, in a call, and the like) of the device and/or external data signals from an external source which provides characterization values of environmental, contextual and/or ambient light characteristics. Ambient light characteristics are a subset of environmental characteristics. Adjustments are made to pulse power to affect the range of the sensor, pulse duration, pulse repetition rate, noise filtering characteristics of an input signal and/or the perceived spectrum of the proximity detector.

As discussed above, FIG. 1, immediate environmental characteristics can be determined. Remotely determined environmental characteristics can be determined as well. Regarding immediate environmental characteristics, proximity sensors are capable of detecting the slightest activity or movement of people 107, 109 locating within the environment 105 in the proximity of the device 101. Some people 107 may be nearby the device 101, whereas others may be distal from the device.

Contextual characteristics can include operational modes of the device 101. Also shown in FIG. 1 is that the device can have one or more contextual characteristics. Since the device 101 is resting on the table 103, the device 101 may be in one or more operational modes. For example, the device may be in stand-by mode, may be receiving an incoming call, may be on speaker mode, or it may be off. These modes as well as many others may provide data signals from a processor of the device to determine contextual characteristics.

Environment, context and ambient light characteristic values also can be determined by correlation of input signals from one or more other sensors of the device 101. Evaluations by correlation to generate characteristic values can include evaluations of input signals of any type of sensors, for example, ambient light by a light sensor, speed or acceleration of the device by an accelerometer, elevation by a barometric/altitude and/or even GPS sensor sensors, proximity of objects by one or more proximity detectors as well as the presence of one or more light spectrums by one or more light sensors. The characteristic values are used to select adjustment levels and/or pulsed durations of the proximity sensor which can result in their optimized functionality and minimize their power consumption. In one embodiment, real-time ambient light characteristics based on input from the proximity detector and/or other sensors of the device or data received by the device can drive adaptive filtering of the sensor. For example, if there is no ambient light containing the spectrum of light to which the sensor is sensitive, then the signal received by the sensor needs not be filtered to reduce or eliminate noise of the signal and power may be saved or range enhanced.

Regarding remotely determined environmental characteristics, the device 101 may include, for example, a GPS transceiver to determine its location. Location external data signals from an external source may be correlated to generate a characterization value representative of the environment and/or context of the device. It is understood that any environmental characteristics, contextual characteristics and/or ambient light characteristics are within the scope of this discussion.

Figure 2:
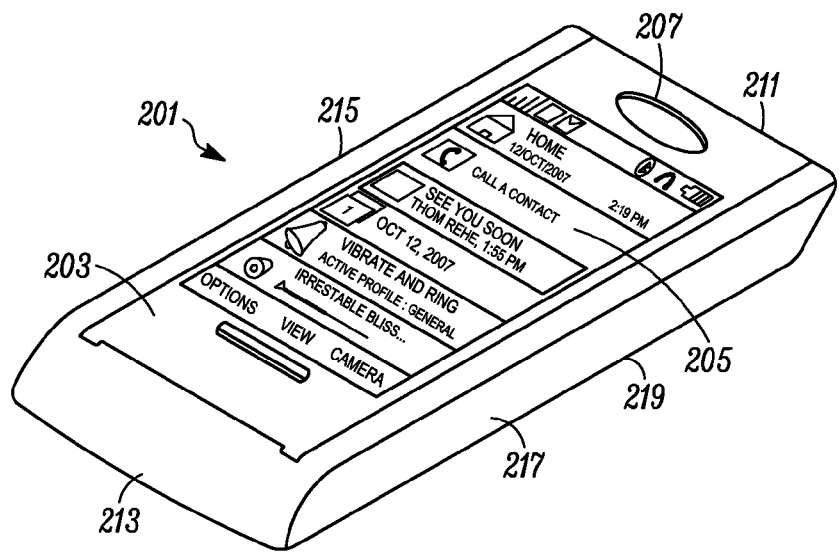
FIG. 2 is a perspective view of an embodiment in accordance with the present invention.

Referring to FIG. 2, there is illustrated a perspective view of an embodiment in accordance with the present invention. The embodiment may be any type of portable electronic device 201 having one or more adjustable proximity sensors. Examples of the portable electronic device 201 include, but are not limited to, cellular-based mobile phones, WLAN-based mobile phones, notebook or laptop computing devices, personal digital assistants, personal navigation device, touch screen input device, pen-based input devices, portable video and/or audio players, electronic toys and the like.

For one embodiment, the portable electronic device 201 has a housing comprising a front surface 203 which includes a visible display 205 which may include touch screen capabilities. For another embodiment, the portable electronic device 201 may include a plurality of input keys in conjunction with the display 205. For yet another embodiment, the portable electronic device 201 may comprise apertures 207, 209 for audio output and input at the front surface 203. It is to be understood that the portable electronic device 201 may include a variety of different combination of displays and interfaces.

In addition to the front surface 203, the housing of the portable electronic device 201 may also include a top surface 211, a bottom surface 213, side surfaces 215, 217, and a back surface 219. The top surface 211, the bottom surface 213, the side surfaces 215, 217 of the housing of the portable electronic device 201 are not required to have any particular shape or configuration relative to the front and back surfaces 203 and 219.

The front surface 203, the top surface 211, the bottom surface 213, the side surfaces 215, 217, and the back surface 219 of the housing may support one or more proximity sensors. Although some proximity sensors may be exposed at a surface of the housing, it is recognized that some types of proximity sensors may function while concealed behind a surface of the housing. If the portable electronic device 201 includes two or more proximity sensors, then proximity sensors may be positioned at opposing surfaces of the housing, so that sensor is directed in a first direction and another sensor is directed in a second direction substantially opposite the first direction, in order to maximize the broadest detection coverage of the characteristics about the environment 105.

Figure 3:
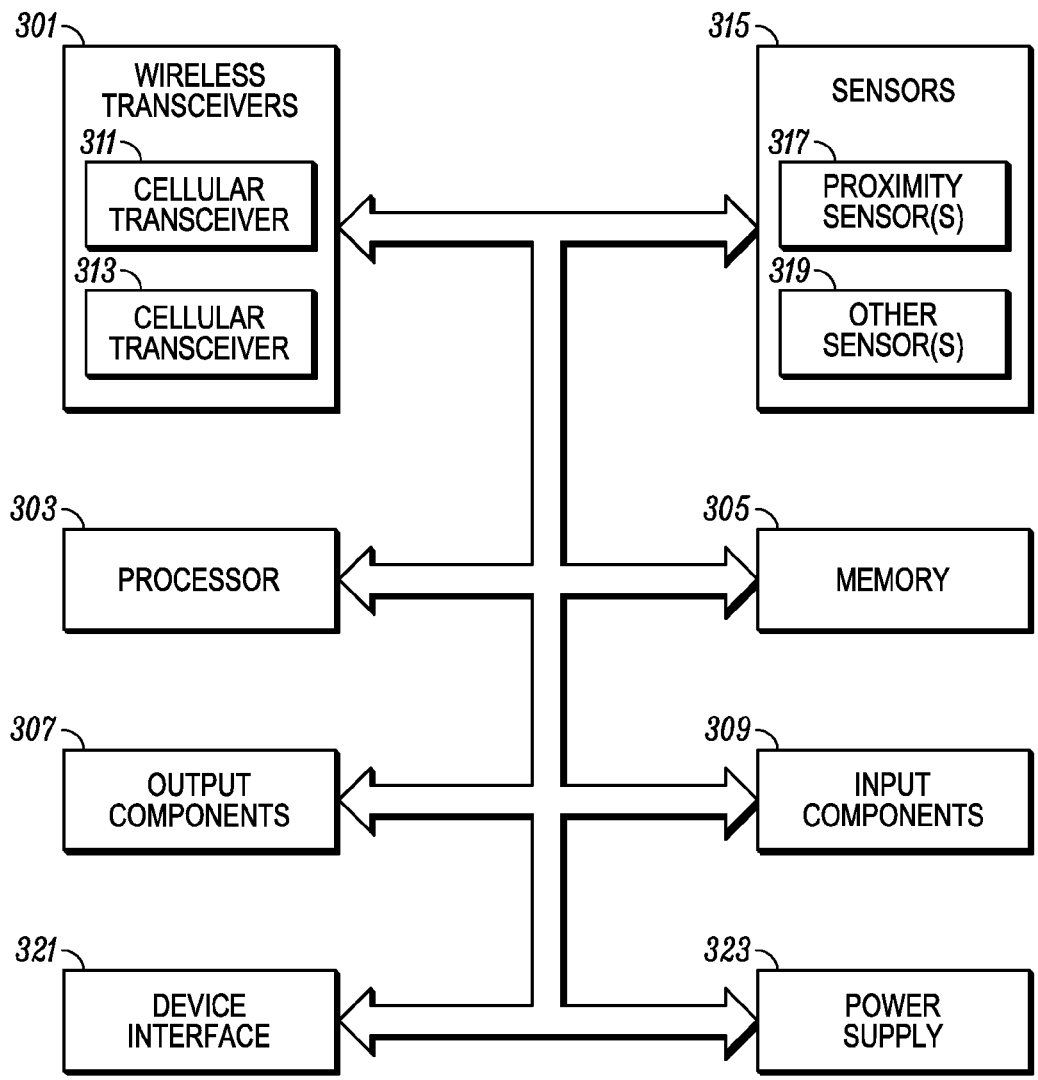
FIG. 3 a block diagram representing example components that may be used for an embodiment in accordance with the present invention.

Referring to FIG. 3, there is shown a block diagram representing example components that may be used for an embodiment in accordance with the present invention. The example embodiment includes one or more wireless transceivers 301, a processor 303, a memory 305, one or more output components 307, and one or more input components 309. Each embodiment may include a user interface that comprises one or more output components 307 and one or more input components 309. Each wireless transceiver 301 may utilize wireless technology for communication, such as, but are not limited to, cellular-based communications such as analog communications (using AMPS), digital communications (using CDMA, TDMA, GSM, iDEN, GPRS, or EDGE), and next generation communications (using UMTS, WCDMA, LTE or IEEE 802.16) and their variants, as represented by cellular transceiver 311. Each wireless transceiver 301 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology, as represented by WLAN transceiver 313. Also, each transceiver 201 may be a receiver, a transmitter or both.

The processor 303 may generate commands based on information received from one or more input components 309 and one or more sensors 315. The processor 303 may process the received information alone or in combination with other data, such as the information stored in the memory 305. Thus, the memory 305 of the internal components 300 may be used by the processor 303 to store and retrieve data. The data that may be stored by the memory 305 include, but is not limited to, operating systems, applications, and data. Each operating system includes executable code that controls basic functions of the portable electronic device, such as interaction among the components of the internal components 300, communication with external devices via each transceiver 301 and/or the device interface (see below), and storage and retrieval of applications and data to and from the memory 305.

Modules stored in memory 305 can carry out certain processes of the methods as described herein. Steps of methods may involve modules and modules may be inferred by the methods discussed herein. Steps of the present invention can be carried out by instructions modules can include determining environmental and contextual characteristics of the device, selecting the pulse power mode of the proximity detector based on determining the environmental and contextual characteristics of the device, adjusting the pulse power mode to affect the range of the sensor, the pulse frequency, filtering of noise of the sensor input signal to attenuate interference and/or the spectrum of a proximity detector, receiving input signals from one or more sensors of the device, receiving data signals from a processor of the device and/or receiving external data signals from an external source, correlating the input signals, the data signal and/or the signals from an external source to evaluate the environment, the contextual characteristics and/or the ambient light characteristics of the device to generate a characterization value and determining from a look-up table adjustments to be made to a proximity sensor of the pulse power mode to affect the range of the sensor, the pulse duration, pulse repetition rate, filtering of noise of the sensor input signal to attenuate interference and/or the selective spectrum range of a proximity detector. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

Each application includes executable code utilizes an operating system to provide more specific functionality for the portable electronic device. Data is non-executable code or information that may be referenced and/or manipulated by an operating system or application for performing functions of the portable electronic device. For example, the processor 303 may retrieve information from the memory 305 to calibrate the sensitivity of the sensors 315.

The input components 309 of the internal components 300 may include a video input component such as an optical sensor (for example, a camera), an audio input component such as a microphone, and a mechanical input component such as button or key selection sensors, touch pad sensor, touch screen sensor, capacitive sensor, motion sensor, and switch. Likewise, the output components 307 of the internal components 300 may include a variety of video, audio and/or mechanical outputs. For example, the output components 307 may include a video output component such as a cathode ray tube, liquid crystal display, plasma display, incandescent light, fluorescent light, front or rear projection display, and light emitting diode indicator. Other examples of output components 307 include an audio output component such as a speaker, alarm and/or buzzer, and/or a mechanical output component such as vibrating or motion-based mechanisms.

The sensors 315 are similar to the input components 309, but are particularly identified separately in FIG. 3 due to their importance for the present invention. The portable electronic device 100, in accordance with the present invention, may include at least one proximity sensor 315 to detect the presence of nearby objects. For example, as illustrated by FIG. 2, the sensors 315 may include one or more proximity sensors 317 such as, but not limited to, capacitive, magnetic, inductive, optical/photoelectric, laser, acoustic/sonic, radar-based, Doppler-based, thermal, and radiation-based proximity sensors. For example, the proximity sensor 317 may be an infrared proximity sensor that transmits a beam of infrared (IR) light, and then computes the distance (or XYZ coordinates/location in the case of multiple proximity sensors via known triangulation techniques) to any nearby objects from characteristics of the returned, reflected signal/s. The returned signal may be detected using an IR photodiode, or IR phototransistor which detects reflected light emanating from the emitting diode (LED) after reflecting off a nearby object. The sensors 315 may also include one or more other sensors 319. Examples of these other sensors 319 include, but are not limited to, accelerometers, touch sensors, surface/housing capacitive sensors, and video sensors (such as a camera). For example, an accelerometer may be embedded in the electronic circuitry of the portable electronic device 201 to show vertical orientation, constant tilt and/or whether the device is stationary. Touch sensors may be used to indicate whether the device is being touched at the side surfaces 215, 217, thus indicating whether or not certain orientations or activities/movements are intentional by the user and/or if the phone is carried by the user and how. Front and back surfaces could also embed touch sensors and are used in conjunction with side sensors.

The internal components 300 may further include a device interface 321 to provide a direct connection to auxiliary components or accessories for additional or enhanced functionality. In addition, the internal components 300 preferably include a power source 323, such as a portable battery, for providing power to the other internal components and allow portability of the portable electronic device 101.

It is to be understood that FIG. 3 is provided for illustrative purposes only and for illustrating components of a portable electronic device in accordance with the present invention, and is not intended to be a complete schematic diagram of the various components required for a portable electronic device. Therefore, a portable electronic device may include various other components not shown in FIG. 3, or may include a combination of two or more components or a division of a particular component into two or more separate components, and still be within the scope of the present invention.

Figure 4:
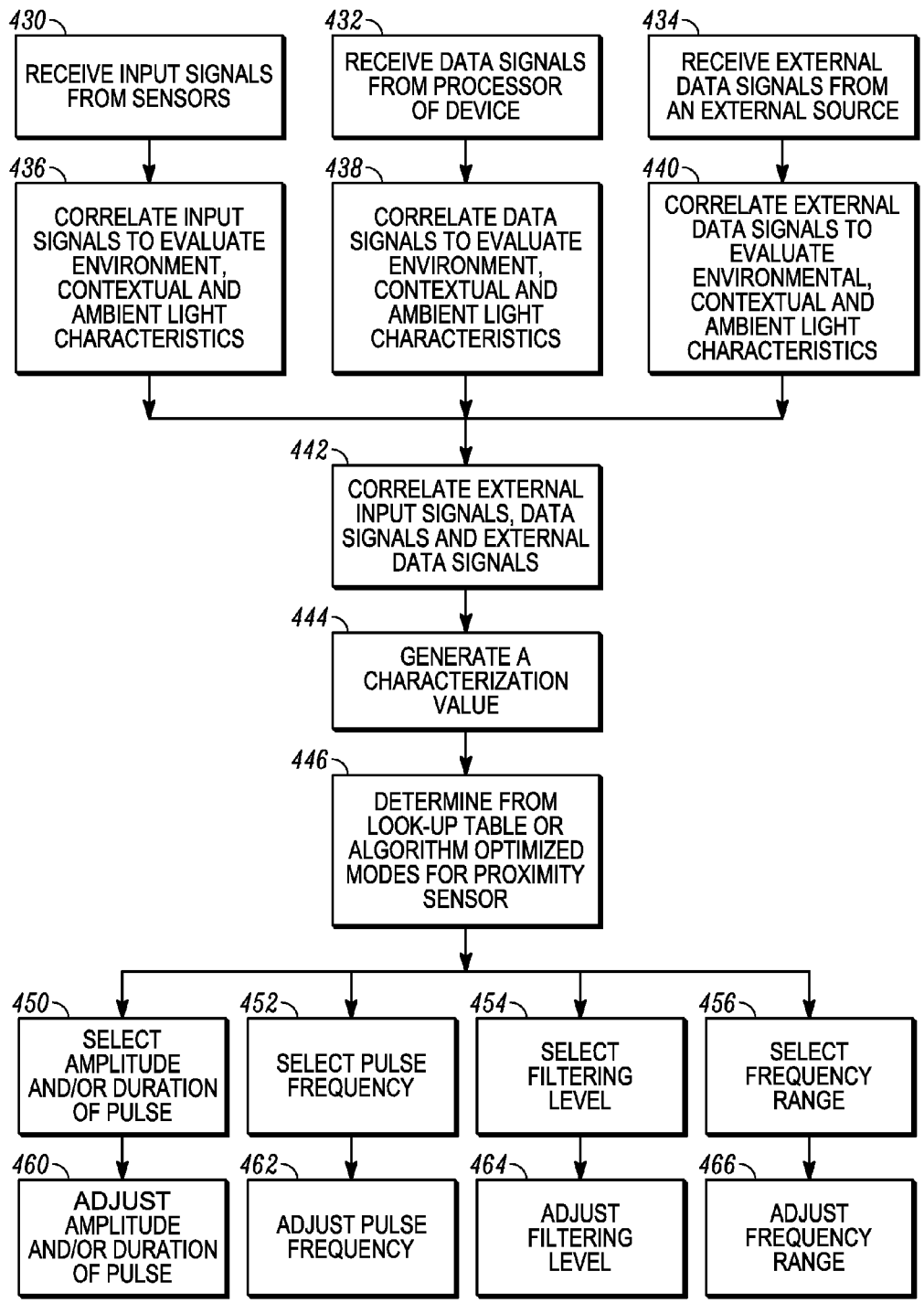
FIG. 4 is a flow diagrams representing operations of an embodiment in accordance with the present invention.

FIG. 4 is a flowchart of an embodiment of the methods of present invention. As discussed above, a device can receive input signals from sensors 430, receive data signals from the processor of the device 432 and/or receive external data signals from an external source 434. Examples were provided above. Further examples of each include that to receive input signals from one or more sensors, an input sensor can be a microphone to determine an echo-state of the environment. Considering certain data available at the processor of the device, such as the time of day, can help distinguish between sunlight interference and artificial incandescent light interference, both have high IR content but are different in magnitude and spectrum, and as such the interference filters can be tuned accordingly. Adding a visible light sensor on top of the time of day can further help determine the type of artificial light present, incandescent which is high in IR content or fluorescent which is low in IR content. In the case of the latter, the filter to reduce or eliminate noise received by the proximity sensor which operates in the infrared range, can be disabled or seriously relaxed and therefore power consumption can be reduced or range enhanced. To receive external data signals from an external source, information about the environment and/or the context of the device may be downloaded from a remote server. Many other examples exist and it is understood that any manner in which to receive input signals from sensors, receive data signals from the processor of the device and/or receive external data signals from an external source are within the scope of this discussion.

By correlating the input signals from sensors 436, data signals from the processor of the device 438 and/or external data signals from an external source 440 to evaluate the environment and/or context of the device, including the ambient light, and/or including all of the values in a correlation process 442 to generate a characterization value 444. Different characterization values can be generated 444 for each type of adjustment, to pulse power to affect the range of the sensor, pulse frequency, filtering of noise of the sensor input signal to attenuate interference and the spectrum of a proximity detector, or combined characterization values can be generated 444. For simplicity of the illustrated flow chart, the case of a single generated characterization value 444 has been provided. The characterization value can be of any suitable units or may be a pure number.

To determine the mode or modes of the proximity sensor of the device 101 (see FIG. 1), one or more characterization values can be compared 446 to a look-up table that can be stored in the memory 305 of the device 101. The look-up table can be stored in the device 101 or remotely accessed. An algorithm in conjunction with the look-up table, or solely may be used to process one or more characterization values to select modes of the a proximity sensor of the device 101.

Upon selection of one or more of the pulse power to affect the range of the sensor 450, pulse frequency 452, filtering of noise of the sensor input signal to attenuate interference 454 and the spectrum of a proximity detector 456, adjustments can be made to the modes of the proximity sensor. Adjustment can include adjustments to pulse power to affect the range of the sensor including the amplitude and duration of the pulse 460, pulse frequency 462, filtering of noise of the sensor input signal to attenuate interference 464 and the spectrum or frequency range of a proximity detector 466. Since the proximity sensors can be ultra-sensitive, making such adjustments can result in their optimized functionality and minimize their power consumption.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of a portable electronic device for adapting a pulse power mode of a proximity sensor configured to detect light of a particular frequency range, the method comprising:
   determining environmental and contextual characteristics of the device;
   selecting the pulse power mode of the proximity sensor based on determining the environmental and contextual characteristics of the device, which comprises:
      receiving one or more characterization values, and
      determining from a look-up table a pulse power mode based on the one or more characterization values; and
   adjusting the pulse power mode of the proximity sensor based on a selected pulse power mode.

2. The method of claim 1, wherein determining environmental and contextual characteristics of the device comprises:
   receiving input signals from one or more sensors of the device; and
   correlating the input signals to evaluate the environment and the context of the device to generate a characterization value representative of the environment and the context of the device.

3. The method of claim 1, wherein determining environmental and contextual characteristics of the device comprises:
   receiving data signals from a processor of the device; and
   correlating the data signals to evaluate the environment and the context of the device to generate a characterization value representative of the environment and the context of the device.

4. A method of a portable electronic device for adapting a pulse power mode of a proximity sensor configured to detect light of a particular frequency range, the method comprising:
   determining environmental and contextual characteristics of the device, which comprises:
      receiving external data signals from an external source, and
      correlating the external data signals to evaluate an environment and a context of the device to generate a characterization value representative of the environment and the context of the device;
   selecting the pulse power mode of the proximity sensor based on determining the environmental and contextual characteristics of the device; and
   adjusting the pulse power mode of the proximity sensor based on a selected pulse power mode.

5. The method of claim 1, wherein adjusting the pulse power mode of the proximity sensor comprises:
   increasing the amplitude of a pulse of the proximity sensor or lengthening the duration of a pulse of the proximity sensor.

* * * * *